C. G. MOHL.
COMBINED HOSE NOZZLE AND LAWN SPRINKLER.
APPLICATION FILED AUG. 23, 1912.
1,081,688.
Patented Dec. 16, 1913.
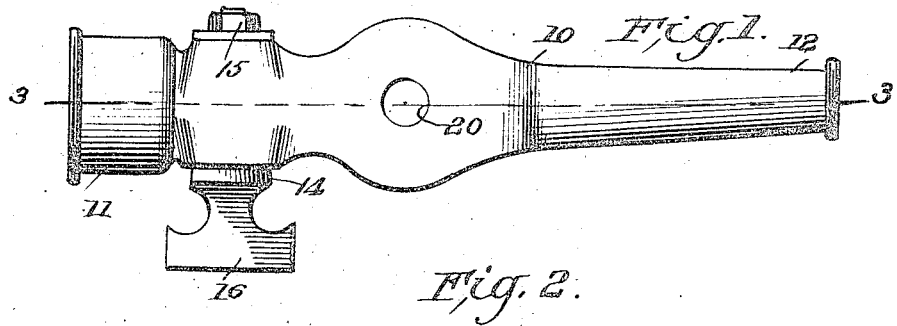
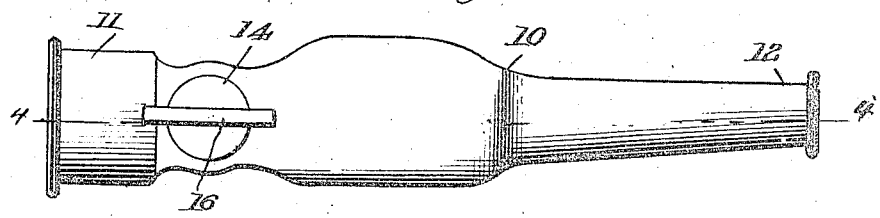
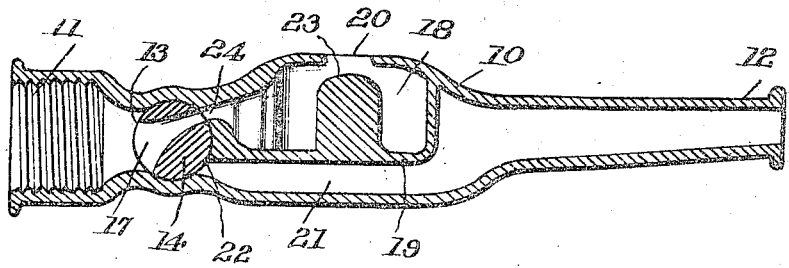
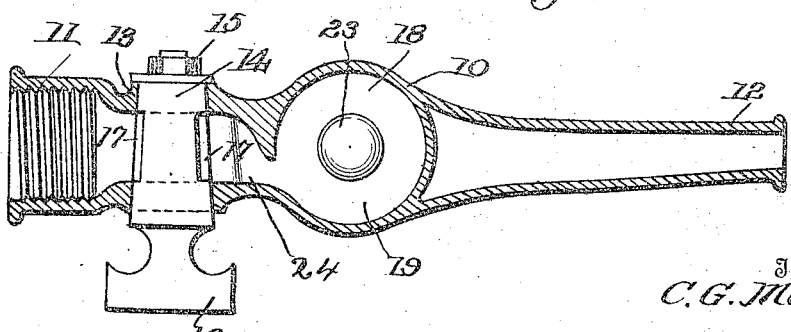
Inventor
C. G. Mohl
Witnesses
By
, Attorneys

UNITED STATES PATENT OFFICE.

CHARLES G. MOHL, OF CADILLAC, MICHIGAN.

COMBINED HOSE-NOZZLE AND LAWN-SPRINKLER.

1,081,688.

Specification of Letters Patent.  Patented Dec. 16, 1913.

Application filed August 23, 1912. Serial No. 716,774.

*To all whom it may concern:*

Be it known that I, CHARLES G. MOHL, citizen of the United States, residing at Cadillac, in the county of Wexford and State of Michigan, have invented certain new and useful Improvements in Combined Hose-Nozzles and Lawn-Sprinklers, of which the following is a specification.

This invention relates to combined hose nozzles and lawn sprinklers, and has for one of its objects to improve the construction and increase the efficiency and utility in devices of this character.

Another object of the invention is to provide a simply constructed device comprising a body having an intake at one end with a hose nozzle at the opposite end, and with a sprinkling nozzle intermediate the ends, and with means whereby the flow of water may be caused to pass entirely through either the discharge nozzle or the sprinkling nozzle or shut off entirely from both.

With these and other objects in view the invention consists in certain novel features of construction which will be hereinafter shown and described and then specifically pointed out in the claims, and in the drawing illustrative of the preferred embodiment of the invention: Figure 1 is a plan view of the improved device. Fig. 2 is a side elevation of the same. Fig. 3 is a longitudinal section on the line 3—3 of Fig. 1. Fig. 4 is a section on the line 4—4 of Fig. 2.

Corresponding and like parts are referred to in the following description and indicated in all the views of the drawing by the same reference characters.

The improved device comprises a body or stock represented as a whole at 10 and with a threaded intake 11 at one end and a discharge nozzle 12 at the opposite end. Formed through the stock 10 adjacent to the intake end 11 is a valve opening 13 to receive a valve plug 14, the latter being preferably tapered and secured in position by a clamp nut 15 in the usual manner at its smaller end and provided with a turn-handle or head 16 at the larger end. The valve-plug 14 is provided with a transverse passage 17 through which the water is caused to flow, as hereafter explained.

The stock 10 is enlarged next to the valve aperture 13 to form a relatively large circular chamber 18 which is closed at the lower end at 19 and with an aperture 20 in its upper side. The bottom 19 is spaced away from the bottom of the stock to provide for a passage 21 for the liquid from the valve aperture to the nozzle, the passage 21 being restricted somewhat as shown at 22 where it communicates with the aperture 13 of the valve. Rising centrally from the bottom 19 of the recess is a retarder-plug 23 which terminates at its upper end relatively close to the aperture 20 and is preferably rounded while the inner edges of the aperture are likewise rounded to accelerate the outflow of water, as hereafter explained.

A passage 24 is provided to form communication between the interior of the chamber 18 and the valve aperture 13. That end of the passage 24 which is located next to the valve opening 13 corresponds in width to the width of the said opening and the passage is contracted toward its other end as at 25 and communicates with the chamber 18. At and adjacent its last mentioned end the passage extends tangentially with respect to the wall of the chamber 18 and is inclined upwardly so that water flowing through the passage is discharged into the chamber at one side and is caused to flow around the interior of the chamber and to be discharged through the aperture 20 with an upwardly directed whirling motion.

In a device thus constructed, when the device is to be employed as a lawn sprinkler, the body 10 is laid upon the ground with the aperture 20 upward and the valve plug 14 turned to cause the water to flow through the passage 24, this position of the valve plug shutting off the flow through the passage 22—21, as will be obvious. By this means an effectual lawn sprinkler is produced of extremely simple construction.

When the device is to be employed as a nozzle the valve plug 14 is turned to open the slot through the valve plug into the passage 22—21 and at the same time shutting off the flow through the passage 24—25. By this simple means a complete spray nozzle and a complete ordinary hose nozzle is produced in one stock and without materially increasing the expense or the cumbersomeness of the device.

The body 10 will be of any required size and of any suitable material.

Having thus described the invention what is claimed as new is:—

1. A hose nozzle having an intake at one end and a discharge at the other end, a chamber within the upper portion of the nozzle and having an opening through the upper side wall of the same communicating with the interior of the chamber, a retarder within the chamber terminating adjacent to the chamber opening, and a valve plug adapted to direct the flow alternatively through the chamber or into the body of the nozzle beneath the chamber.

2. A hose nozzle having an intake at one end and a discharge at the other end and provided with a valve seat near the intake end, a chamber within the nozzle at the upper side having an opening through the upper wall of the nozzle communicating with the interior of the chamber, and having a passage between the chamber and the valve seat arranged tangentially and inclined upwardly relative to the chamber, a retarder within the chamber terminating adjacent to the outlet, and a valve plug operating in the valve seat for directing the flow through either the chamber or the body of the nozzle.

In testimony whereof I affix my signature in presence of two witnesses.

CHARLES G. MOHL. [L. S.]

Witnesses:
 JOHN HAWTHORN,
 ALEX CARLSON.